(12) United States Patent
Choi et al.

(10) Patent No.: US 8,379,700 B2
(45) Date of Patent: Feb. 19, 2013

(54) METHOD FOR TRANSMITTING DATA OVER VOICE CHANNEL

(75) Inventors: Yu Tae Choi, Seoul (KR); Young Seok Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 543 days.

(21) Appl. No.: 12/625,155

(22) Filed: Nov. 24, 2009

(65) Prior Publication Data

US 2010/0266001 A1    Oct. 21, 2010

(30) Foreign Application Priority Data

Apr. 21, 2009    (KR) .................. 10-2009-0034646

(51) Int. Cl.
*H04L 5/16* (2006.01)
*H04B 7/00* (2006.01)

(52) U.S. Cl. ...................... 375/222; 455/41.2

(58) Field of Classification Search .......... 375/219–222, 375/272, 295, 303; 455/419–420, 563; 340/426.16, 340/438, 445

See application file for complete search history.

(56) References Cited

U.S. PATENT DOCUMENTS

| 6,996,397 | B2 | 2/2006 | Fraser et al. | |
|---|---|---|---|---|
| 7,218,925 | B2 * | 5/2007 | Crocker et al. | 455/419 |
| 7,312,697 | B2 * | 12/2007 | Veliu et al. | 340/438 |
| 2004/0234053 | A1 * | 11/2004 | Reeser | 379/88.22 |
| 2007/0054702 | A1 * | 3/2007 | Rokusek et al. | 455/563 |
| 2007/0086579 | A1 * | 4/2007 | Lorello et al. | 379/45 |
| 2007/0092024 | A1 | 4/2007 | Madhavan et al. | |
| 2007/0258398 | A1 * | 11/2007 | Chesnutt et al. | 370/328 |
| 2008/0247484 | A1 | 10/2008 | Chesnutt et al. | |
| 2008/0255828 | A1 * | 10/2008 | Chesnutt et al. | 704/201 |
| 2010/0085171 | A1 * | 4/2010 | Do | 340/426.1 |

FOREIGN PATENT DOCUMENTS

KR    10-2002-0093854 A    12/2002
KR    10-2008-0051391         6/2008

* cited by examiner

*Primary Examiner* — Khanh C Tran
(74) *Attorney, Agent, or Firm* — Edwards Wildman Palmer LLP; Peter F. Corless

(57) ABSTRACT

The present invention features a digital data communications system for transmitting a voice or digital data between a terminal mounted in a vehicle and an external server, including a MDOV modem configured to modulate the digital data to include frequency characteristics of vowel and consonant of the voice; and a transceive module configured to transceive the modulated signal through a voice channel.

10 Claims, 7 Drawing Sheets

METHOD FOR TRANSMITTING DATA OVER VOICE CHANNEL

CROSS-REFERENCE TO RELATED APPLICATION

This application claims under 35 U.S.C. §119(a) the benefit of Korean Patent Application No. 10-2009-0034646 filed on Apr. 21, 2009, the entire contents of which are incorporated herein by reference.

BACKGROUND OF THE INVENTION

The present invention relates, in general, to wireless communications systems, and more particularly, to a method for transceiving digital data through a voice channel of digital wireless communications network.

Generally, a voice communications system in a digital wireless communications network uses an encoding and decoding algorithm suitably optimized for voice characteristics so as to efficiently send an exact voice. Preferably, a vocoder performs an encoding and decoding of voice in such a wireless voice communications system. The vocoder suitably converts the voice into a digital signal through linear prediction coding algorithms which usually uses the linear feature of voice. Additionally, besides the linear prediction coding algorithm for converting the voice, by having an additional algorithm for removing an interference which is not the voice or by having a linear prediction coding algorithm including an algorithm which can remove the interference, most vocoders can improve the quality of the voice communications system.

The linear prediction coding algorithm of a vocoder suitably predicts and evaluates the voice characteristic of a given section according to the linear characteristics of voice, and then, codes the characteristic with contraction. It assigns many contraction data bits and codes in detail in a section where the voice is highly changed or the voice exists abundantly, while assigning small contraction data bit and roughly codes in a section having non-linear characteristics and monotonous characteristics. Moreover, in some cases, the change in a section having non-linear characteristics and monotonous characteristics can be suitably removed through a noise elimination algorithm.

The digital wireless telecommunications network is required to send not only a simple voice but also data on a real time basis. Particularly, since a voice channel which is used to send a voice has a relatively larger bandwidth in comparison with other channels in the wireless telecommunications system, if it sends data by using the voice channel, it can send much more high-capacity data on a real time basis. However, data which are made by the random repetition of 0 and 1 and, resultantly, must have a non-linear form should be different from the voice having linear characteristics. In case of encoding and decoding the data through the linear prediction coding algorithm of a vocoder, the data can be easily distorted due to the property difference of the voice and data. Accordingly, a data communications algorithm for preventing the distortion in the process of encoding and decoding the data is required for the vocoder so as to send the data by using a vocoder which performs the encoding and decoding of the voice. Hereinafter, the method for transceiving data by using a voice channel in a digital wireless telecommunications network will be illustrated in detail.

FIG. 1 is a conceptual diagram for illustrating an exemplary wireless communications network which provides an in-band signaling (IBS) according to a conventional technology.

As shown, the wireless communications network preferably includes a terminal 14 for suitably transmitting a voice signal 31 encoded through a voice channel 34 and a base station 36 for suitably receiving the voice signal 31 transmitted from the terminal 14. Preferably, the voice signal 31 transmitted through the base station 36 is suitably changed to be transmitted through a cellular telecommunication switching system (CTSS) 38 through a wired network.

Preferably, a voice 22 transmitted from a user 23 of the terminal 14 is suitably encoded through the vocoder 18 which is included within the terminal 14. The encoded voice signals are transmitted to Public Switched Telephone Network (PSTN) 42 through the digital voice channel 34 via the base station 36, and then suitably transmitted to the terminal which the other user uses through the PSTN 42. If it is decoded in the vocoder within the terminal which the other user uses, the transmission of the voice through the wireless communications network is suitably completed.

When data is inputted from a data source 30 through the vocoder 18, there can be a difference in that it is converted to an audio signal 26 similar to the voice 22 via an in-band signaling modem 28 before being encoded through the vocoder 18. Thereafter, the audio signal 26 converted through the in-band signaling modem 28 is suitably encoded through the vocoder 18, and transmitted to the cellular telecommunication switching system 38 through the voice channel 34. When data is inputted from the data source 30, it can be suitably transmitted to a server 40 which is in a destination location through an IP network 46, or can be suitably transmitted to a terminal which the other user uses through the PSTN 42. Preferably, the server 40 includes an ISB modem 28, so that it can decode a signal encoded by the vocoder 18.

FIG. 2 is a block diagram for illustrating an exemplary preferred structure of encoder 52 within an in-band signaling modem 28 illustrated in FIG. 1.

As shown, an encoder 52 of the in-band signaling modem 28 preferably includes a data buffer 58, a packetizer 60, a packet formatter 62 and an IBS modulator 64. Preferably, data inputted from the data source 30 are suitably divided by the packetizer 60 with a given size unit of a packet payload following a packet header. Preferably, the packet formatter 62 adds a packet preamble or a packet postamble for suitably preventing the deformation of the packet payload and suitably enhancing the transmission efficiency. Preferably, the IBS modulator 64 modulates by using two or more different tone frequencies 66, 68 so as to generate the audio signal 26 having features similar to the voice 22 through receiving a IBS packet 70 outputted from the packet formatter 62.

The operation of the in-band signaling modem 28 can be illustrated with both of the encoding and the decoding. For example, in the transmission side, the IBS packet 70 is suitably encoded with two different complex tones 66, 68 which indicates bit 0 and bit 1 used in a frequency band between 400 Hz and 1000 Hz and transmitted. Preferably, in the receiving side, the decoder configures a signal-noise ratio (SNR) with an energy ratio of an in-band filter of a band in which complex tones are suitably formed from an input audio signal to an out-of-band filter in which complex tones does not exist, and decodes the payload after activating the IBS modem and exactly synchronizing from a sync pattern when this value exceeds a critical point.

FIG. 3 is a conceptual diagram for illustrating a preferred exemplary configuration of the IBS packet 70 illustrated in FIG. 2.

As shown, the IBS packet 70 preferably includes a preamble 73 consisting of a sacrifice bit 71, a header 72 and a sync pattern 74, a postamble 79 including a sacrifice bit 75, a payload 76 and a checksum 78. The sacrifice bit 71, 75 in the front and the rear of IBS packet 70 suitably prevents an automatic gain controller (AGC) of the vocoder 18 of the terminal 14 from distorting the payload. Preferably, the sync pattern 74 prevents the vocoder 18 from transforming the payload by generating signals similarly with the voice signal through the arrangement of 0 and 1. In some cases, the distortion of the payload through an adaptable filter within the vocoder 18 can be suitably reduced by inserting some bits of the payload 76 into the preamble 73.

When data having the nonlinear feature are encoded by using the vocoder 18, there still exists a probability that the data can be distorted and contracted. To prevent this problem, the conventional method for inserting a pattern where '0' or '1' is arranged or inserting a meaningless sacrifice bit in the front or rear of the packet is preferably used. However, the insertion of a specific pattern or a meaningless sacrifice bit into data having the nonlinear feature does not mean that the data have similar characteristics to the voice. Accordingly, there still exists a probability that the data can be distorted and contracted in the encoding process through the vocoder 18.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention provides a method for sending and receiving digital data through a voice channel of wireless communications network, and provides a system capable of suitably preventing the distortion or contraction of data and enhancing the data transmission rate wherein a vocoder always encodes with a maximum bit rate to suitably send and receive through the voice channel by using a method of converting digital data so as to have a property like the voice which considerably changes.

According to a preferred embodiment of the present invention, a digital data communications system for transmitting a voice or a digital data between a terminal mounted in a vehicle and an external server comprises a MDOV modem that is suitably configured to modulate the digital data to include frequency characteristics of vowel and consonant of the voice and a transceive module that is suitably configured to transceive the modulated signal through a voice channel.

According to another preferred embodiment, the present invention features a method for transceiving a voice or a digital data between a terminal mounted in a vehicle and an external server, that comprises suitably modulating the digital data to include frequency characteristics of vowel and consonant of the voice and transceiving the modulated signal through a voice channel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

DETAILED DESCRIPTION OF THE EMBODIMENTS

Figure 1:
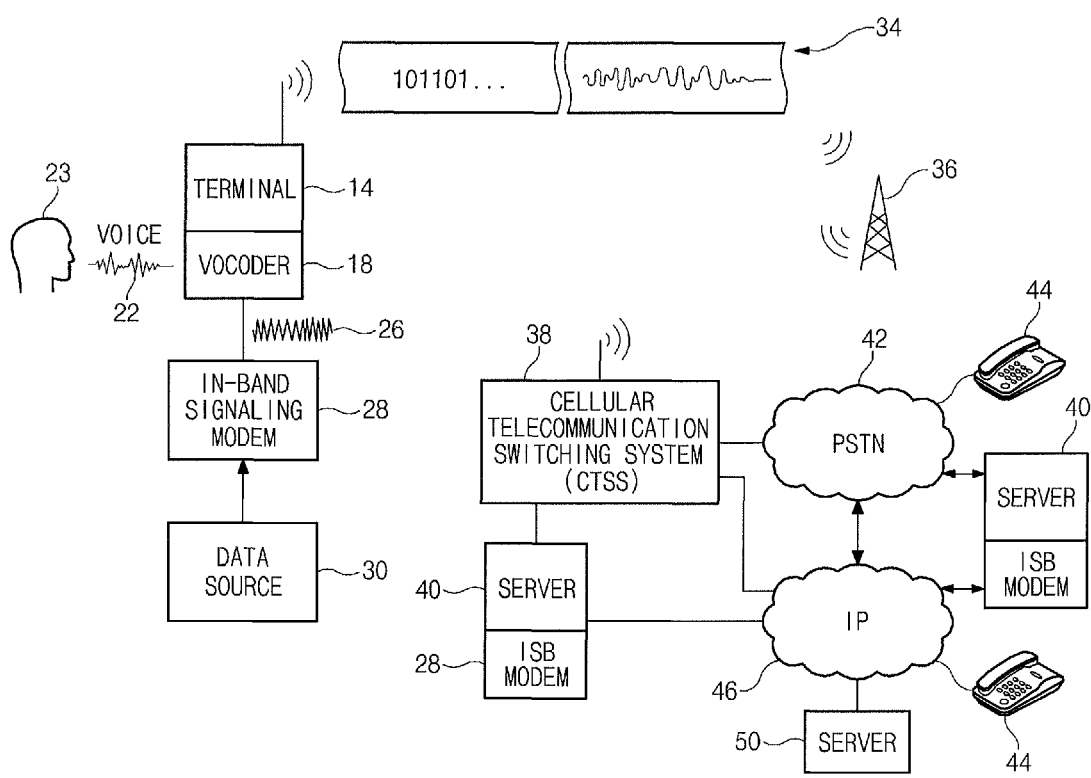
FIG. 1 is a conceptual diagram showing an exemplary wireless communications network which provides an in-band signaling (IBS) of a conventional technology.
Figure 2:
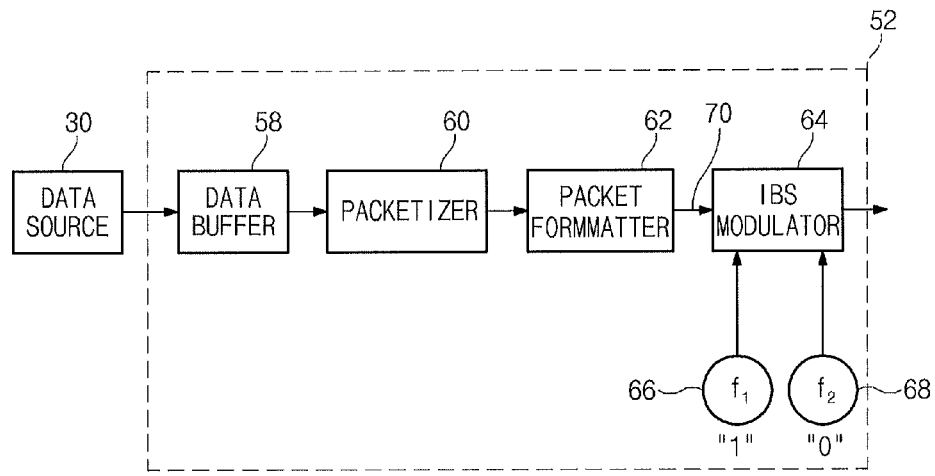
FIG. 2 is a block diagram for illustrating an exemplary structure of encoder within an in-band signaling modem 28 illustrated in FIG. 1.
Figure 3:
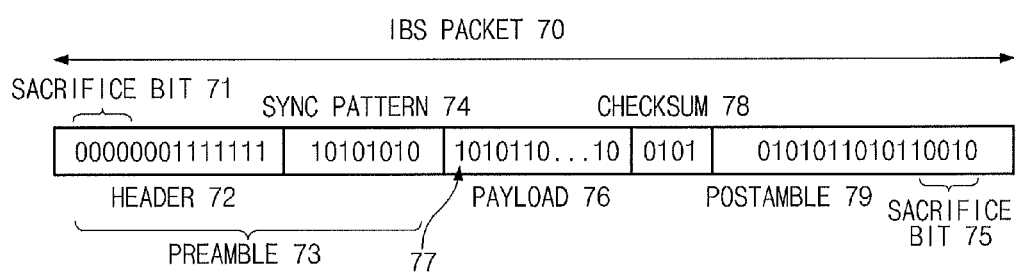
FIG. 3 is a conceptual diagram for illustrating an exemplary configuration of the IBS packet illustrated in FIG. 2.

As described herein, the present invention includes a digital data communications system for transmitting a voice or a digital data between a terminal mounted in a vehicle and an external server, comprising a MDOV modem, and a transceive module.

In one embodiment, the MDOV modem is configured to modulate the digital data to include frequency characteristics of vowel and consonant of the voice.

In another embodiment, the transceive module is configured to transceive the modulated signal through a voice channel.

In another further embodiment, the terminal further comprises a telematics terminal which includes the MDOV modem; and a cell phone which includes the transceive module.

In another embodiment, the telematics terminal and the cell phone are coupled by a Bluetooth communication.

In still another embodiment, the frequency characteristic of vowel is a result of modulating the digital data by using one of M-ary FSK, M-ary PSK, M-ary BPSK, or M-ary DPSK of low frequency band.

In another embodiment, the frequency characteristic of consonant is formed through the insertion of dummy signal of medium frequency band.

The invention also features a method for transceiving a voice or a digital data between a terminal mounted in a vehicle and an external server, the method comprising modulating the digital data to include frequency characteristics of vowel and consonant of the voice; and transceiving the modulated signal through a voice channel.

In one embodiment, the modulating the digital data comprises converting the digital data to generate a signal including the frequency characteristics of vowel and consonant of the voice, sending the signal from a telematics terminal to a cell phone; and modulating the transmitted signal to transceive through the voice channel.

In another embodiment, the signal is sent through a Bluetooth communication.

According to preferred embodiments, the present invention prevents the distortion or contraction of digital data, when transceiving digital data through a voice channel within a mobile network. Accordingly, in preferred embodiments of the present invention, digital data have a form like the vowel of a changeable voice by preferably using M-ary FSK (Frequency Shifting Keying), M-ary PSK, M-ary BPSK (Binary Frequency Shifting Keying) or M-DPSK (Mufti Array Differential Phase Shift Keying) of low frequency band through an in-band signaling modem before being suitably transmitted to a vocoder and converted into a form like a voice which is highly changeable by inserting a dummy signal which is similar to the consonant of medium frequency range. According to certain preferred embodiments, if the digital data is suitably converted to a form like a voice which is highly changeable through the in-band signaling modem, the vocoder suitably performs an encoding operation with a maximum bit rate, so that the distortion or contraction of digital data can be suitably prevented. Hereinafter, the communications system of digital data according to an embodiment of the present invention is illustrated in detail with reference to FIGS. 4 to 8*b*.

Figure 4:
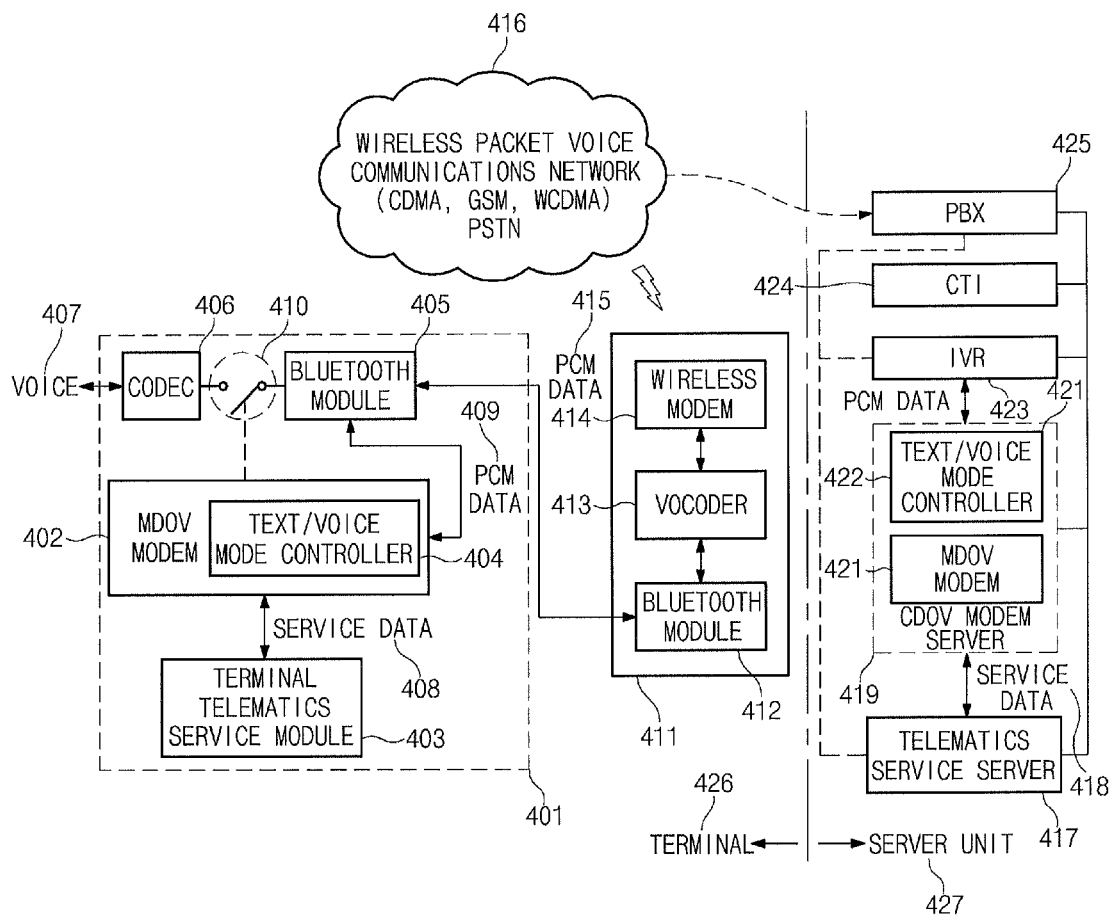
FIG. 4 is a configuration diagram of telematics system implemented by using a MDOV modem according to a preferred embodiment of the present invention.

FIG. 4 is a configuration diagram of a preferred telematics system implemented by using a MDOV modem according to an embodiment of the present invention.

In certain exemplary embodiments, for example as shown in FIG. 4, the telematics system preferably includes a telematics terminal 401 installed in the vehicle, wherein the terminal unit 426 consists of a cell phone 411, and a server unit 427 for preferably providing a telematics service to users on a real time basis, and that transceives data for service by using a wireless packet voice communications network 416 which is a voice channel of the wireless network. Preferably, the telematics terminal 401 installs a Bluetooth module 412 instead of a wireless modem, and, through it, transceives PCM data 415 with the cell phone 411 having the Bluetooth module 412. In further preferred embodiments, the telematics terminal 401 preferably includes a switching unit 410 for selectively delivering output from a codec 406 converting a voice 407 into a predetermined digital format.

In further preferred embodiments, the cell phone 411 suitably encodes the PCM data 415 received from the telematics terminal 401 through a vocoder 413 within the cell phone 411 and transmits through a wireless MODEM 414, while sending the transmitted data to the service server unit 427 through the wireless packet voice communications network 416. In further embodiments, the packet data that flowed into the cell phone 411 through the wireless packet voice communications network 416 from the service server unit 427 in a reverse direction is suitably decoded in the vocoder 413 within the cell phone 411, while the decoded data are sent to the telematics terminal 401 through the Bluetooth module 412.

As described herein, after a service communications line is suitably connected between the telematics terminal 401 and the telematics service server 417, the voice 407 of user is transceived to the telematics service server 417. According to certain exemplary embodiments, if the data transmission from the server 417 is necessary due to a telematics service scenario, a MDOV modem 402 of the terminal 26 and a MDOV modem server 419 of the server unit 427 are converted into a data transceive mode by a mode switching scenario.

Preferably, the telematics service server 417 sends a service data 418 to the MDOV modem server 419. According to further embodiments, the MDOV modem server 419 receiving the service data 418 encodes this and outputs to an interactive voice response (IVR) 423 as a PCM data 422, while the interactive voice response (IVR) 423 makes private branch exchange (PBX) 425 to send to the terminal unit 426 through the wireless packet voice communications network 416. Further, the telematics terminals 401 that received the PCM data 422 decodes through the MDOV modem 402, while the decoded service data 408 is suitably transmitted to the terminal telematics service module 403.

In other embodiments, even when data transmission from the telematics terminal 401 is necessary with the telematics service scenario during the voice communications between the user and the telematics service server 417 after the service communications line is connected between the telematics terminal 401 and the telematics service server 417, the telematics terminal 401 and the MDOV modem server 419 are suitably converted into the data transceive mode with the mode switching scenario.

Accordingly, then, in further preferred embodiments, the terminal telematics service module 403 preferably sends the service data 408 for transmission to the MDOV modem 402, so that the data are suitably encoded. The MDOV modem 402 sends the PCM data 409 which encoded the received transmission data 408 to the Bluetooth module 405 of the terminal and sends to the cell phone 411. Preferably, the cell phone 411 encodes this in the vocoder 413 and sends to the server unit 427 through the wireless packet voice communications network 416. The PCM data 422 transmitted to the MDOV modem server 419 through the PBX 425 and the interactive voice response (IVR) 423 of the server unit 427 is outputted as the service data 418 after decoding, and the service data is suitably transmitted to the telematics service server 417. According to other embodiments of the present invention, although not directly relating to the telematics service, general voice data transmitted through the PBX 425 can be suitably transmitted to a computer telephony integration (CTI) 424 to be processed.

As described herein, if the data transceive is completed bidirectionally or in a specific direction with the service scenario, it is suitably converted again into the voice mode with the mode switching scenario, so that the voice communications between the terminal 26 and the server unit 27 is available.

Figure 5:
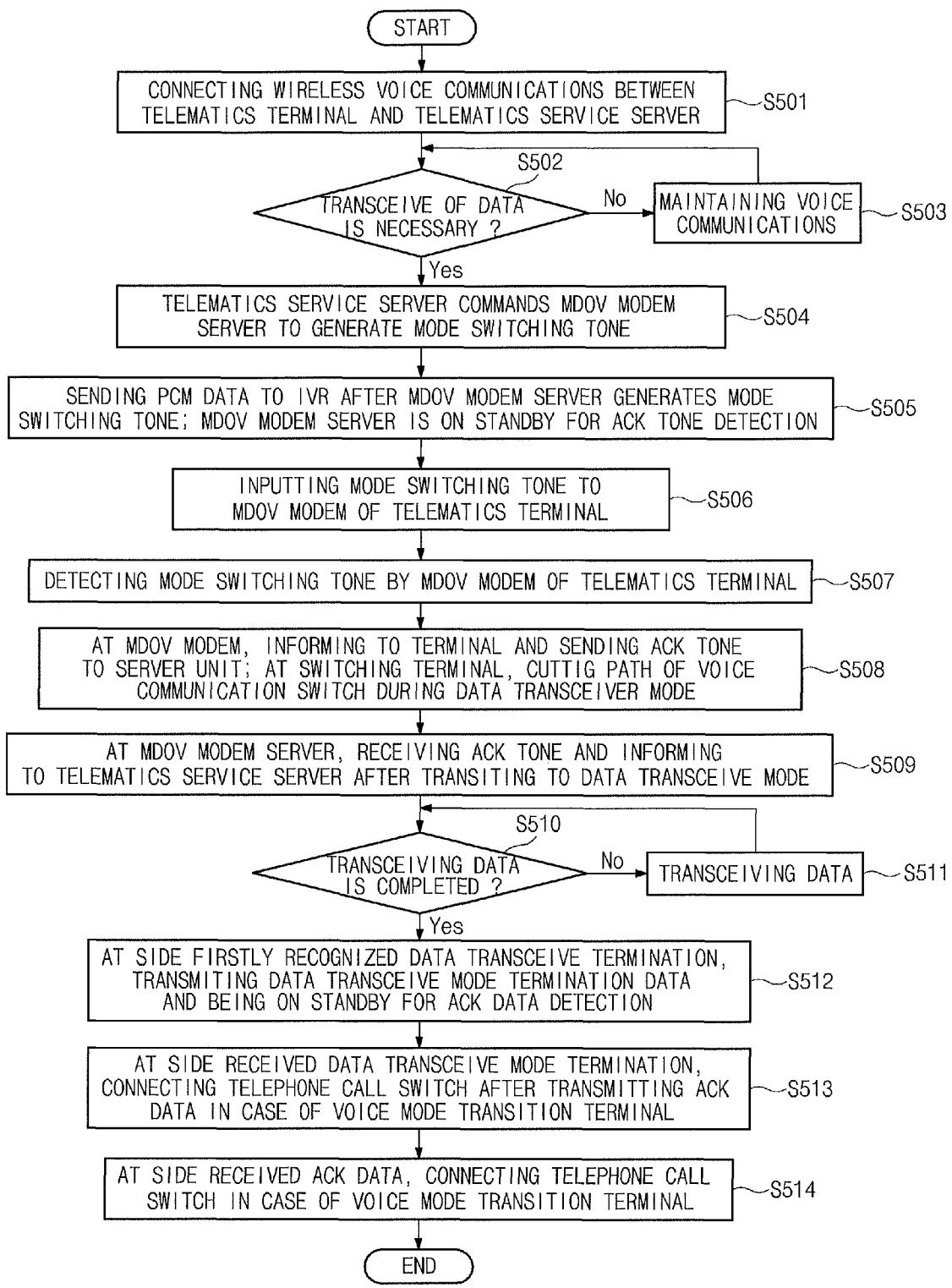
FIG. 5 is a flowchart of mode switching scenario in a telematics system according to a preferred embodiment of the present invention.

FIG. 5 is a flowchart of mode switching scenario in a telematics system according to another preferred embodiment of the present invention;

Preferably, firstly, after the service communications line is suitably connected between the terminal 401 and the telematics service server 417, the connection of the voice mode is made between the user and the server unit 427 so that the voice communications is suitably available. (S501). In this state, the telematics terminal 401 suitably connects a telephone call switch 410 so that the call PCM data 415 inputted from the server unit 427 be inputted to not only the user but also the MDOV modem 402, and inputs the PCM data 415 to the MDOV modem 402 so that the MDOV modem 402 can watch a mode switching tone. Similarly, the MDOV modem server 419 is on standby so as to generate the mode switching tone by a command of the service server.

Accordingly, it is determined whether the transceive of data is necessary with the service scenario (S502). Preferably, the voice communications is maintained when it is not necessary, and it is watched whether the transceive of data is necessary (S503).

According to a related embodiment if the transceive of data is necessary with the service scenario, the telematics service server 417 commands the MDOV modem server 419 to suitably generate the mode switching tone (S504).

Accordingly, the generated mode switching tone is suitably transmitted to the interactive voice response (IVR) 423 as PCM data 422 and transmitted to the telematics terminal 401 through the wireless packet voice communications network 416 (S505).

Preferably, a text/voice mode controller 404 within the MDOV modem 402 detects this mode switching tone and notifies to the telematics terminal 401 (S506), while the telematics terminal 401 blocks the connection of the telephone call switch 410 so that the voice is unable to be communicated in a user direction (S507).

Then, in a further related embodiment, the MDOV modem 402 suitably transits to the data transceive mode and informs to the telematics terminal 401 that the MDOV modem 402 has transited to the data transceive mode, passing this to the cell phone 411 by generating an ACK tone so that the server unit 427 can recognize it. Preferably, after generating the mode switching tone, the MDOV modem server 419 of the server unit 427 waits until the ACK tone is suitably inputted from the telematics terminal 401 (S508).

Preferably, after confirming the input of the ACK tone from the telematics terminal 401, the MDOV modem server 19 suitably transits to the data transceive mode, informs this to the telematics service server 417 (S509). Preferably, the transceive of data is made after both of the terminal unit 426 and the server unit 427 are transited to the data transceive mode. Preferably, it is then confirmed whether the transceive of data by the service scenario is suitably completed (S510), and the data transceive mode is maintained according to the result (S511).

According to a further embodiment of the present invention, a side which firstly recognized a data transceive termination among the terminal unit 426 and the server unit 427 suitably transmits a data transceive mode termination signal, and then standbys the ACK data detection (S512). A side which received the data transceive mode termination signal transits to the voice mode after transmitting the ACK data, connecting again the telephone call switch 410 in case of the telematics terminal 401 (S513). Preferably, a part that received the ACK data transits to the voice mode, and connects again the telephone call switch 410 in case of the telematics terminal 401 (S514).

Figure 6:
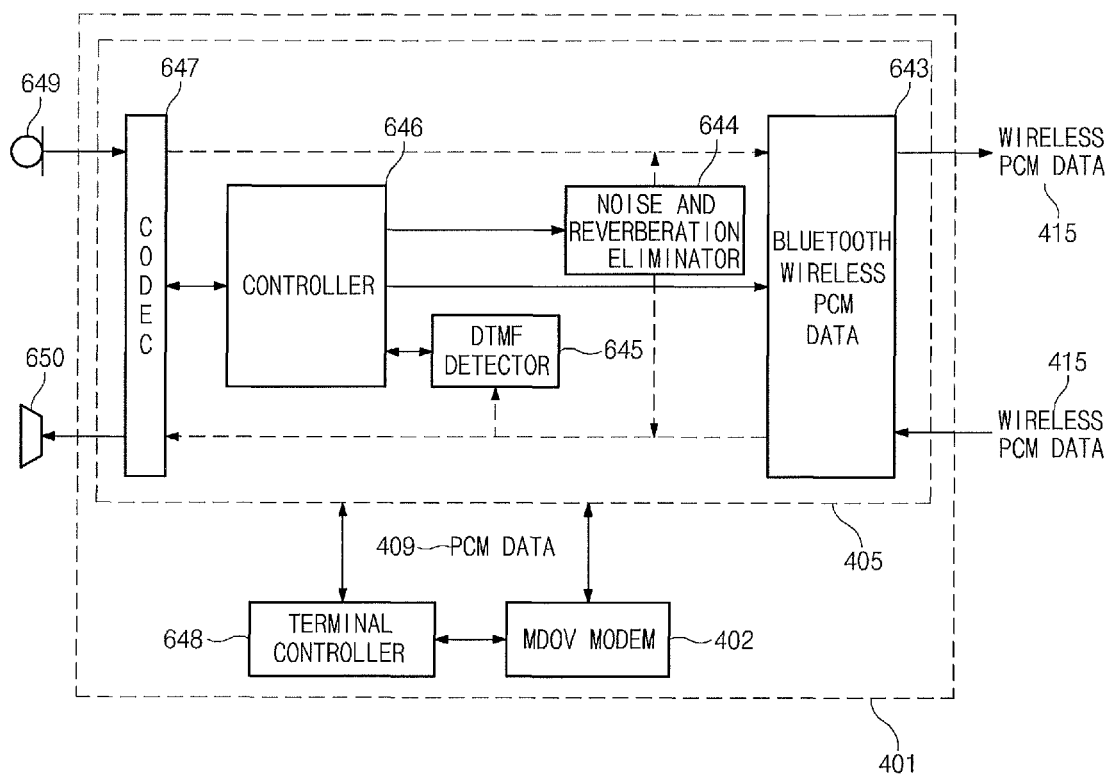
FIG. 6 is a block diagram for illustrating a Bluetooth module within a telematics terminal illustrated in FIG. 4.

FIG. 6 is a block diagram for illustrating a Bluetooth module 405 within a telematics terminal 401 illustrated in FIG. 4;

According to certain exemplary embodiments, and as shown in FIG. 6, a Bluetooth module 405 for forming the mode switching tone includes, in one module, not only a Bluetooth wireless interface and wireless PCM module 643 relating to this, a codec 647 relating to an audio module, and a controller 646 controlling various modules, but also may include a noise and reverberation eliminator 644 to suitably eliminate the noise and reverberation, and that is also designed to implement various functions which are to be provided in connection with the telematics service in one Bluetooth module by separately arranging CPU for an application program which is not a basic Bluetooth module.

In other preferred embodiments, as to the transmission of the digital data 408 through the MDOV modem 402 when suitably implementing the MDOV modem 402 by using this Bluetooth module 405, in the data transceive mode which transceives digital data so as to prevent the distortion of the PCM data 409 which encodes digital data to transmit, the operation of the noise and reverberation eliminator 644 needs to be suitably stopped.

In further embodiments, when being converted to the data transceive mode from the voice mode, the output of a speaker 650 has to be cut as early as possible. In another exemplary embodiment, in another configuration example of the mode switching scenario of the present invention, a DTMF (dual tone mufti frequency) detector 645 is suitably implemented within the Bluetooth module 405. Preferably, the DTMF detector 645 can be suitably implemented by using a CPU usually provided within the Bluetooth module 405, or can be implemented between the speaker 650 and a codec 647 with a single chip type.

As described above, according to certain preferred embodiments of the present invention, after the service communications line is suitably connected between the telematics terminal 401 and the telematics service server 417, a voice mode is suitably formed between the user and the server unit 427 so that the voice communications is available. In this state, the Bluetooth module 405 makes the call PCM data 415 inputted from the server unit 427 to be suitably outputted through the speaker 650 and to be continuously monitored in the DTMF detector 645. In this voice mode, the PCM data 409 transmission between the Bluetooth module 405 and the MDOV modem 402 is not suitably performed. The MDOV modem server 419 in such state is on standby so as to generate a DTMF tone for the mode switching by the command of the telematics service server 417.

Preferably, if the transceive of digital data is necessary due to the service scenario, the telematics service server 417 makes the MDOV modem server 419 to suitably generate a mode switching tone determined as a specific DTMF tone. In a related embodiment, the generated mode switching tone is suitably transmitted to the interactive voice response 423 as PCM data 422 and transmitted to the telematics terminal 401 through the wireless packet voice communications network 416. Preferably, the DTMF detector 645 within the Bluetooth module 405 senses this and notifies to the controller 446. The controller 446 stops the output of speaker 650 and the operation of the noise and reverberation eliminator 644 and notifies the detection of mode switching tone to a terminal controller 448. Accordingly, the path of PCM data 409 between the Bluetooth module 405 and the MDOV modem 402 is suitably opened and the Bluetooth module 405 which received a ACK tone from the MDOV modem 402 sets up the data transceive mode.

In other certain embodiments of the present invention, the transition from the data transceive mode to the voice mode is made by suitably transmitting a special text, and the Bluetooth module 405 connects the output of the speaker 650 and operates again the noise and reverberation eliminator 644 when the transition to the voice mode is made.

Figure 7:
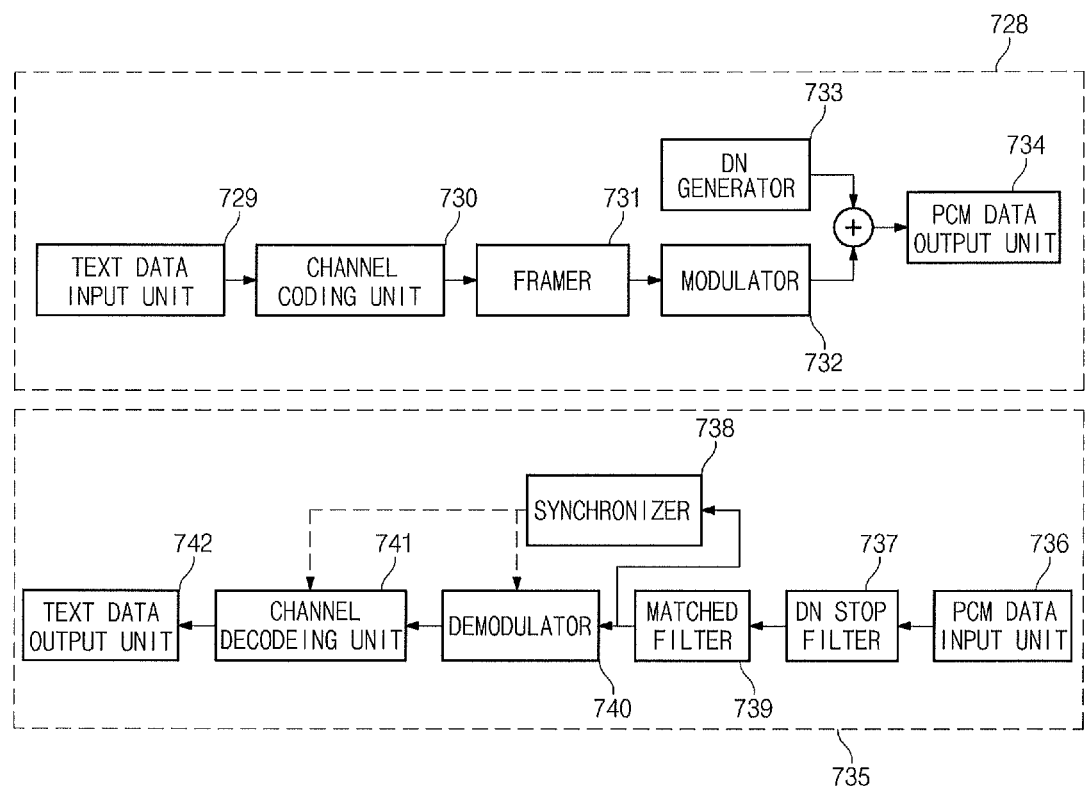
FIG. 7 is a block diagram for illustrating a MDOV modem illustrated in FIG. 4.

FIG. 7 is a block diagram for illustrating the MDOV modem 402 illustrated in FIG. 4.

According to certain preferred embodiments and as shown in FIG. 7, the MDOV modem 402 is classified into a transmitter 728 which is an encoding part and a receiver 735 which is a decoding part. In particular preferred embodiments, the transmitter 728 includes, although may not be limited to, a digital data input unit 729, a channel coding unit 730, a framer 731, a modulator 732, a DN generator 733 and a PCM data output unit 734. In other preferred embodiments, the receiver 735 includes, although may not be limited to, a DN stop filter 737, a matched filter 739, a synchronizer 738, a demodulator 740, a channel decoding unit 741, a digital data output unit 742 and a PCM data input unit 736. Hereinafter, in an exemplary embodiment of the present invention, elements having a specific function are illustrated in detail, and the description of elements which are well known to a person skilled in the art are omitted.

According to preferred embodiments of the present invention, the digital data input unit 729 included in the transmitter 728 of the MDOV modem 402 plays the role of sending and receiving digital data with a high level application end of modem. Preferably, the channel coding unit 730 codes data which are suitably inputted with inserting an error correction code like FEC (forward error correction) or LDPC (low-density parity check), and the framer 731 forms the coded data with transmission data packets of a given unit. In certain preferred embodiments, the transmission data packet preferably includes a preamble for the start synchronization and symbol synchronization of packet, a payload which is channel-coded data for transmission, and a postamble consisting of guide data for protecting payload signals. According to certain preferred embodiments, the modulator 732 modulates a binary signal made in the framer 731 into a form suitable for the algorithm of the vocoder 413 for wireless packet voice communications network 416. Basically, a carrier wave of low frequency band between 300 Hz and 1200 Hz is used, and the embodiment of the present invention is characterized in that the modulation is performed by using M-ary FSK, M-ary PSK, M-ary BPSK, or M-ary DPSK.

In further preferred embodiments, the DN generator 733 generates a filtered Gaussian noise filtered of 1800 Hz to 3600 Hz frequency band and adds to the modulation signal so as to make a spectrum which is similar to the highly changeable voice signal. Preferably, the filtering is suitably characterized in that it is designed to indicate the consonant characteristic of the voice in this band, while the signal intensity is suitably generated with approximately −12 dB than the intensity of the modulated signal.

Figure 8A:
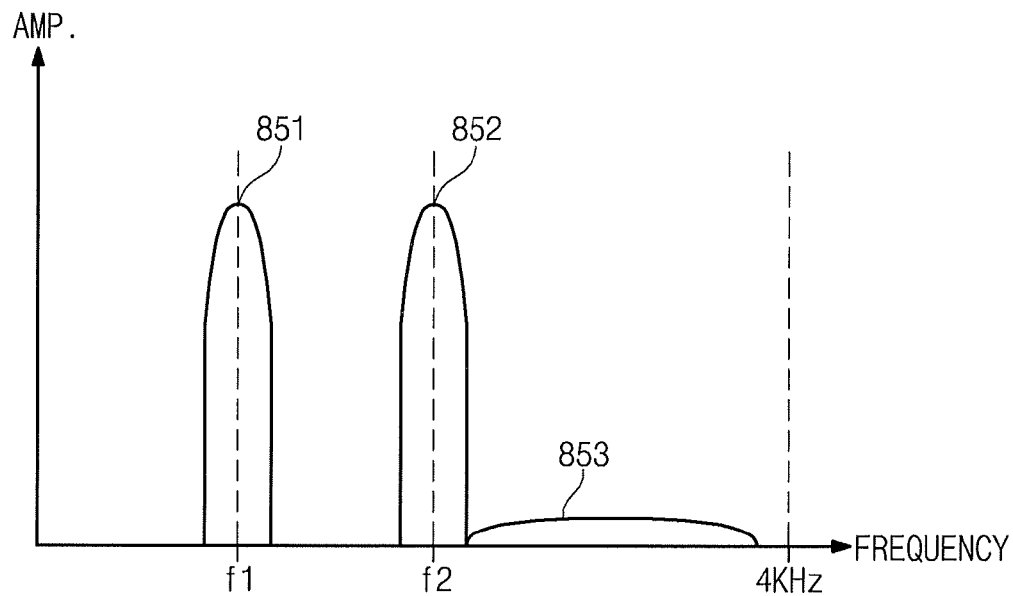
FIGS. 8a and 8b are a graph for schematically illustrating frequency characteristics of signals outputted from the MDOV modem illustrated in FIG. 7.
Figure 8B:
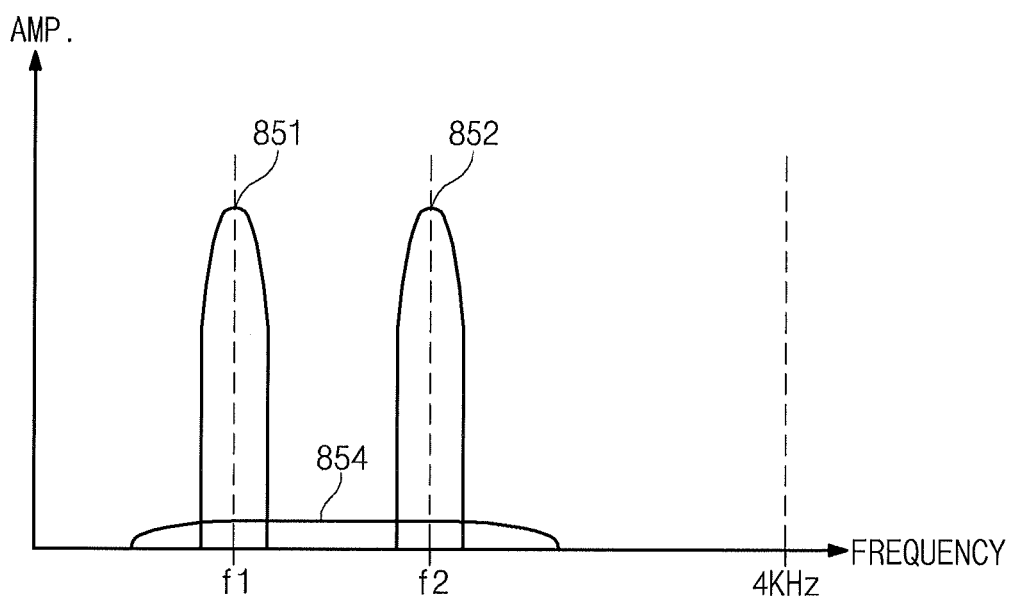

FIGS. 8*a* and 8*b* are a graph for schematically illustrating frequency characteristics of signals outputted from the MDOV modem 402 illustrated in FIG. 7

According to certain preferred embodiments of the invention, and referring to FIG. 8*a*, the final modulation signal is suitably comprised of low-frequency signals 851, 852 having arbitrary carrier frequency (f1 and f2) less than 4 KHz and a filtered Gaussian noise signal 853 which is adjacent to the frequency band of low-frequency signals 851, 852 on a frequency domain and spread to outside. Preferably, in the wireless voice communications network, when coding the inputted voice signal by using the linear prediction coding algorithm, the vocoder preferably examines the characteristic of the first inputted voice. Accordingly, if it is determined that the inputted voice signal is a highly changeable voice signal, the coding is suitably performed with a maximum bit allocation in the coding. Preferably, the highly changeable voice is a voice which transits between two voices having different characteristics while mostly including both of the consonant and the vowel. Preferably, the waveform generated by the modulation of the M-ary FSK or the M-ary PSK, especially, the M-ary DPSK of low frequency band used in the embodiment of the present invention has mostly characteristics of the vowel of voice.

In certain exemplary embodiments, for example in the case of only having the characteristic of vowel, it can be similar to the voice which is still monotonous according to the situation. And if it is determined as monotonous voices or as monotonous noises by the vocoder, the bit allocation can be suitably decreased in encoding or it can be distorted or contracted by the noise elimination algorithm. Accordingly, to overcome this, in certain preferred embodiments, the present invention makes the vocoder of the wireless voice communications network to recognize the inputted signal as a highly changeable voice signal by purposely mixing the modulated signal of low frequency band having the characteristic of vowel with a bit weak signal of medium or high frequency band having the characteristic of consonant. Thus, the maximum bit allocation in encoding of the vocoder is suitably induced so that the distortion of modulated signal is prevented and a rapid data communications speed is possible.

In other preferred embodiments and referring, for example, to FIG. 8*b*, the final modulated signal is suitably formed with low-frequency signals 851, 852 having arbitrary carrier frequency (f1 and f2) less than 4 KHz, and a filtered Gaussian noise signal 854 shown in a broad band including a frequency band of low-frequency signals 851, 852 on a frequency domain. Preferably, the filtered Gaussian noise signal 854 is suitably generated with minimum −15 dB in comparison with the magnitude of low-frequency signals 851, 852 and added to the low-frequency signals 851, 852 so as to enhance the SNR (signal to noise ratio).

In still other preferred embodiments, for example as shown in FIG. 8*a* or 8*b*, the synthesized signal is suitably outputted to the high level application end while being buffered by the PCM data output unit 734. Preferably, in the receiver 735 of the MDOV modem 402, the PCM data input unit 736 is an element playing the role of receiving and buffering the PCM data and the DN stop filter 737 is a filter for removing the DN signal in the received signal, using a band pass filter within 300 Hz to approximately 1500 Hz in the frequency domain used as a carrier wave.

Preferably, the Matched filter 739 and the demodulator 740 are an element which suitably extracts desired binary data by demodulating the modulated signal, and the channel decoding unit 741 is an element which makes a user signal in which errors are suitably corrected with demodulated binary data. Preferably, the finally decoded and extracted data are outputted by the digital data output unit 742. As described above, the present invention can suitably prevent the distortion or contraction of data generated in the encoding process using a vocoder in the conventional technology, by using the vocoder which encodes the voice after converting the digital data having nonlinear characteristics different with the voice into similarly to the voice, and tranceives through the voice channel. Further, the present invention can suitably enhance the data transmission rate by transceiving the data through a voice channel in which the bandwidth is broad in a mobile network, so that it can provide various telematics services to a driver who gets on vehicle when it is applied to a moving vehicle.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A digital data communications system for transmitting a voice or a digital data between a terminal mounted in a vehicle and an external server, comprising:
- a MDOV modem configured to modulate the digital data to include frequency characteristics of vowel and consonant of the voice; and
- a transceive module configured to transceive the modulated signal through a voice channel,
- wherein the frequency characteristic of vowel is a result of modulating the digital data and the frequency characteristic of consonant is formed through insertion of dummy signal of medium frequency band.

2. The digital data communications system of claim 1, wherein the terminal comprises;
- a telematics terminal which includes the MDOV modem; and
- a cell phone which includes the transceive module,
- wherein the telematics terminal and the cell phone are coupled by a Bluetooth communication.

3. The digital data communications system of claim 1, wherein the frequency characteristic of vowel is a result of modulating the digital data by using one of M-ary FSK (Frequency Shifting Keying), M-ary PSK (Phase Shift Keying), M-ary BPSK (Binary Phase Shift Keying), and M-ary DPSK (Differential Phase Shift Keying) of low frequency band.

4. The digital data communications system of claim 1, wherein the dummy signal of medium frequency band is a filtered Gaussian noise signal which is included in a frequency range greater than or equal to a frequency range of a plurality of low-frequency signals in the low frequency band and spread in a range lower than a maximum 4 KHz in a frequency domain.

5. The digital data communications system of claim 1, wherein the transmission of the voice signal or the digital data is determined by a mode tone.

6. A method for transceiving a voice or a digital data between a terminal mounted in a vehicle and an external server, the method comprising:
- modulating the digital data to include frequency characteristics of vowel and consonant of the voice; and
- transceiving the modulated signal through a voice channel,
- wherein the frequency characteristic of vowel is a result of modulating the digital data and the frequency characteristic of consonant is formed through insertion of dummy signal of medium frequency band.

7. The method of claim 6 wherein the modulating the digital data comprises;
- converting the digital data to generate a signal including the frequency characteristics of vowel and consonant of the voice;
- sending the signal from a telematics terminal to a cell phone through a Bluetooth communication; and
- modulating the transmitted signal to transceive through the voice channel.

8. The method of claim 6, wherein the frequency characteristic of vowel is a result of modulating the digital data by using M-ary FSK (Frequency Shifting Keying), M-ary PSK (Phase Shift Keying) or M-ary BPSK (Binary Phase Shift Keying) of low frequency band; and the frequency characteristic of consonant is formed through the insertion of dummy signal of medium frequency band.

9. The method of claim 6, wherein the dummy signal of medium frequency band is a filtered Gaussian noise signal which is included in a frequency range greater than or equal to a frequency range of a plurality of low-frequency signals in the low frequency band and spread in a range lower than a maximum 4 KHz in a frequency domain.

10. The method of claim 6, further comprising generating a mode tone for determining the transmission of the voice signal or the digital data.

* * * * *